United States Patent
Schnurr

(10) Patent No.: US 8,229,456 B2
(45) Date of Patent: *Jul. 24, 2012

(54) SYSTEM AND METHOD OF WIRELESS PROXIMITY AWARENESS

(75) Inventor: Jeffrey R. Schnurr, Waterloo (CA)

(73) Assignee: Research In Motion Limited, Waterloo (CA)

( * ) Notice: Subject to any disclaimer, the term of this patent is extended or adjusted under 35 U.S.C. 154(b) by 530 days.

This patent is subject to a terminal disclaimer.

(21) Appl. No.: 11/779,427

(22) Filed: Jul. 18, 2007

(65) Prior Publication Data

US 2007/0275768 A1 Nov. 29, 2007

Related U.S. Application Data

(63) Continuation of application No. 11/371,386, filed on Mar. 9, 2006, now Pat. No. 7,266,395, which is a continuation of application No. 10/696,975, filed on Oct. 30, 2003, now Pat. No. 7,035,618.

(51) Int. Cl.
*H04W 24/00* (2009.01)

(52) U.S. Cl. ................................... 455/456.1

(58) Field of Classification Search ............... 455/404.2, 455/456.1–456.8
See application file for complete search history.

(56) References Cited

U.S. PATENT DOCUMENTS

| | | | |
|---|---|---|---|
| 6,565,608 B1 | 5/2003 | Fein et al. | |
| 6,609,004 B1 | 8/2003 | Morse et al. | |
| 6,618,593 B1 | 9/2003 | Drutman et al. | |
| 6,681,109 B1 | 1/2004 | Leifer | |
| 6,829,491 B1 | 12/2004 | Yea et al. | |
| 6,909,903 B2 | 6/2005 | Wang | |
| 6,968,179 B1 | 11/2005 | DeVries | |
| 7,020,480 B2 | 3/2006 | Coskun et al. | |
| 7,024,195 B2 | 4/2006 | Miriyala et al. | |
| 7,082,118 B1 | 7/2006 | Sethi | |
| 2002/0019829 A1 | 2/2002 | Shapiro | |
| 2002/0042277 A1* | 4/2002 | Smith | 455/456 |
| 2002/0177435 A1 | 11/2002 | Jenkins et al. | |
| 2003/0083047 A1* | 5/2003 | Phillips et al. | 455/412 |
| 2003/0125042 A1* | 7/2003 | Olrik. et al. | 455/456 |
| 2004/0157625 A1 | 8/2004 | Gheorghiu et al. | |
| 2004/0180646 A1 | 9/2004 | Donley et al. | |
| 2004/0198398 A1 | 10/2004 | Amir et al. | |
| 2005/0010584 A1* | 1/2005 | Reponen | 707/100 |
| 2005/0012611 A1 | 1/2005 | Osman | |

FOREIGN PATENT DOCUMENTS

| | | |
|---|---|---|
| EP | 1169873 | 1/2002 |
| EP | 1176840 A1 | 1/2002 |
| FR | 2830148 A1 | 3/2003 |
| WO | 00/22860 A1 | 4/2000 |
| WO | 03025012 | 3/2003 |

* cited by examiner

*Primary Examiner* — Dwayne Bost
*Assistant Examiner* — Joshua Schwartz
(74) *Attorney, Agent, or Firm* — Jones Day

(57) ABSTRACT

The present application provides a system for proximity awareness for mobile data communication on an electronic communication device comprising a client application on an electronic communication device communicating across a wireless network, and an awareness server that includes a plurality of server objects that monitor multiple devices on a wireless communication network. In addition, the client application on the electronic communication device comprises a plurality of software objects. The client application periodically broadcasts the current wireless tower that the device is communicating on to the awareness server. The awareness server tracks the location of other Tower IDs of other users in the individual's contact list. If there is a match in Tower IDs, an alert is sent to both users that they are in proximity to each other.

11 Claims, 5 Drawing Sheets

SYSTEM AND METHOD OF WIRELESS PROXIMITY AWARENESS

CROSS REFERENCE TO RELATED APPLICATION

This application is a continuation of U.S. patent application Ser. No. 11/371,386, filed on Mar. 9, 2006 now U.S. Pat. No. 7,266,395, which is a continuation of U. S. patent application Ser. No. 10/696,975, filed on Oct. 30, 2003 now U.S. Pat. No. 7,035,618.

BACKGROUND

1. Technical Field

The present invention relates generally to the field of wireless proximity awareness using a communication device.

2. Description of the Related Art

Wireless proximity presence notification refers to wireless alerts sent to the wireless devices of other individuals, friends or contacts that are within proximity, relative to the wireless network communication towers. A wireless device is an electronic communication device that enables two or more individuals to communicate using voice or data. Examples of wireless devices include pagers, cellular phones, cellular smart-phones, wireless handheld organizers, and wirelessly enabled notebook computers.

Although many wireless devices enable remote, ubiquitous communication across large boundaries, there is also value associated with face-to-face communication, especially among contacts that keep in touch using wireless devices. Users of wireless device often travel without knowing that another user, such as a friend or business contact is nearby. If they are made aware of their proximity, both users may be able to get together for a meeting to conduct business or as a social gathering.

Known wireless communication devices do not provide a method for presence notification based on proximity; this invention seeks to accomplish this shortcoming.

SUMMARY

The details of a disclosed herein may enable the development of a system and method of wireless proximity awareness in a communication device. It is an object of the present application that a system and method of wireless proximity awareness be defined.

The present application, a system for proximity awareness for mobile data communication on an electronic communication device comprising of a client application on an electronic communication device communicating across a wireless network, and an awareness server consisting of a plurality of server objects that monitors multiple devices on a wireless communication network. In addition, the client application on the electronic communication device comprises of a plurality of software objects.

Other aspects and features of the present application will become apparent to those ordinarily skilled in the art upon review of the following description of specific embodiments of the present invention in conjunction with the accompanying figures.

BRIEF DESCRIPTION OF THE DRAWINGS

Embodiments of the present application will now be described, by way of example only, with reference to the attached figures, wherein.

Like reference numerals are used throughout the figures to denote similar elements and features.

DETAILED DESCRIPTION OF THE DRAWINGS

The present invention relates to a system and method of wireless proximity awareness for wireless devices. This system permits users to be alerted of other wireless device users that are in proximity of the user's location. When two users on a pre-defined list of contacts (or Buddy-list) are near each other, an alert is sent from the proximity awareness server to both users. Both users can then use email, instant message or voice communication to communicate and set up a face-to-face meeting, for example. Benefits of proximity awareness include increased productivity during downtime, increased business development opportunity, and increased personal satisfaction being able to meet contacts.

The system of interest comprises a client application on a wireless device communicating with an awareness server located securely behind an organization's unsolicited network traffic controller. The unsolicited network traffic controller comprises of a firewall or a secure virtual private network (VPN) connection.

The proximity awareness server interacts with devices that communicate either on the same wireless network or on different, even non-compatible, wireless networks. The awareness server connects multiple users on multiple networks to enable seamless communication and notification. The awareness server is hosted either at a wireless carrier, a wireless application service provider or securely behind the firewall of the individuals' enterprise. Regardless of the location of where the awareness server is hosted, the awareness server is capable of communicating with users from multiple networks and/or different corporations.

Figure 1:
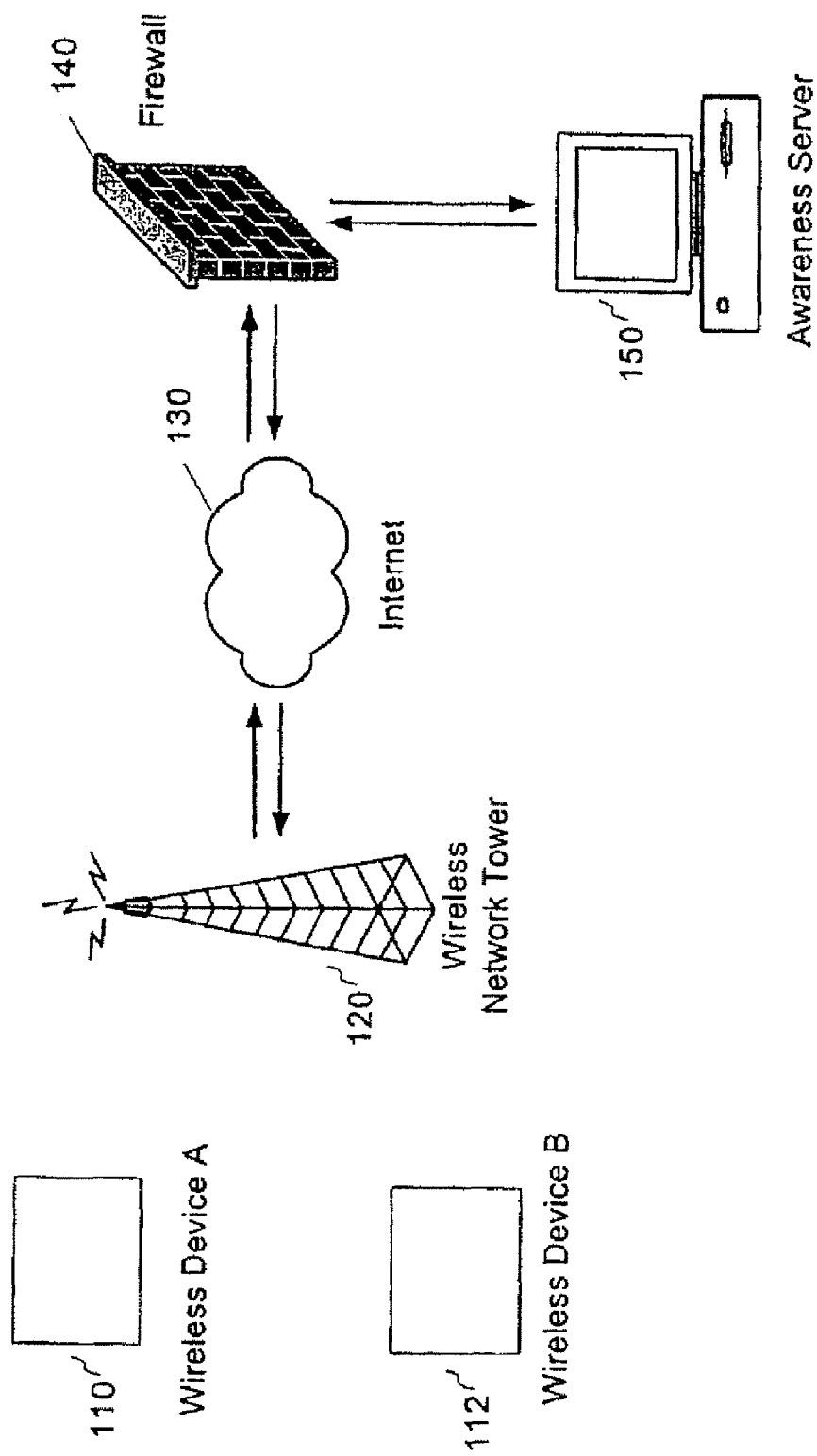
FIG. 1 is a block diagram illustrating a system overview of the wireless communication system.

Referring to the drawings, FIG. 1 is a block diagram illustrating a system overview of the wireless communication system. The system encompasses the wireless devices 110, 112, each running a client application, the wireless network tower 120, the awareness server 150, the Internet 130 and the firewall 140. The client application refers to a software application on the wireless device that includes monitoring of the current location, sending location updates to the wireless network 120 and receiving incoming proximity alerts from the wireless network 120.

The communication path between each wireless device and the awareness server 150 includes the air link from wireless device 110, 112 to the wireless network tower 120, across the Internet 130 to the awareness server 130 located securely behind an organization's firewall 140. The return path of communication will be the same route, but in the opposite direction.

The wireless device 110, 112 constantly listens to the wireless network tower 120 that it is connected to, as well as neighbouring towers in its proximity, and stores the device identifier and tower identifier in memory. The client application on each wireless device contains software objects that handle the processing of incoming data, monitoring the list of network towers, sending out updates to the awareness server 150 and triggering alerts once a proximity and contact match is found.

The client application enables wireless devices on the same wireless network, as well as, devices from other wireless networks to communicate. The ability to communicate on different networks is accomplished through an awareness server interface. The awareness server 150 has the ability to connect users from either the same or multiple networks together to communicate.

The awareness server 150 monitors a list of wireless devices and sends out proximity alerts. This server is hosted either by a wireless network carrier, by a wireless application service provider, or securely behind a company's firewall 140, as shown in FIG. 1. The wireless network tower 120 is a network base station or radio tower that both wireless devices are currently communicating on.

Figure 2:
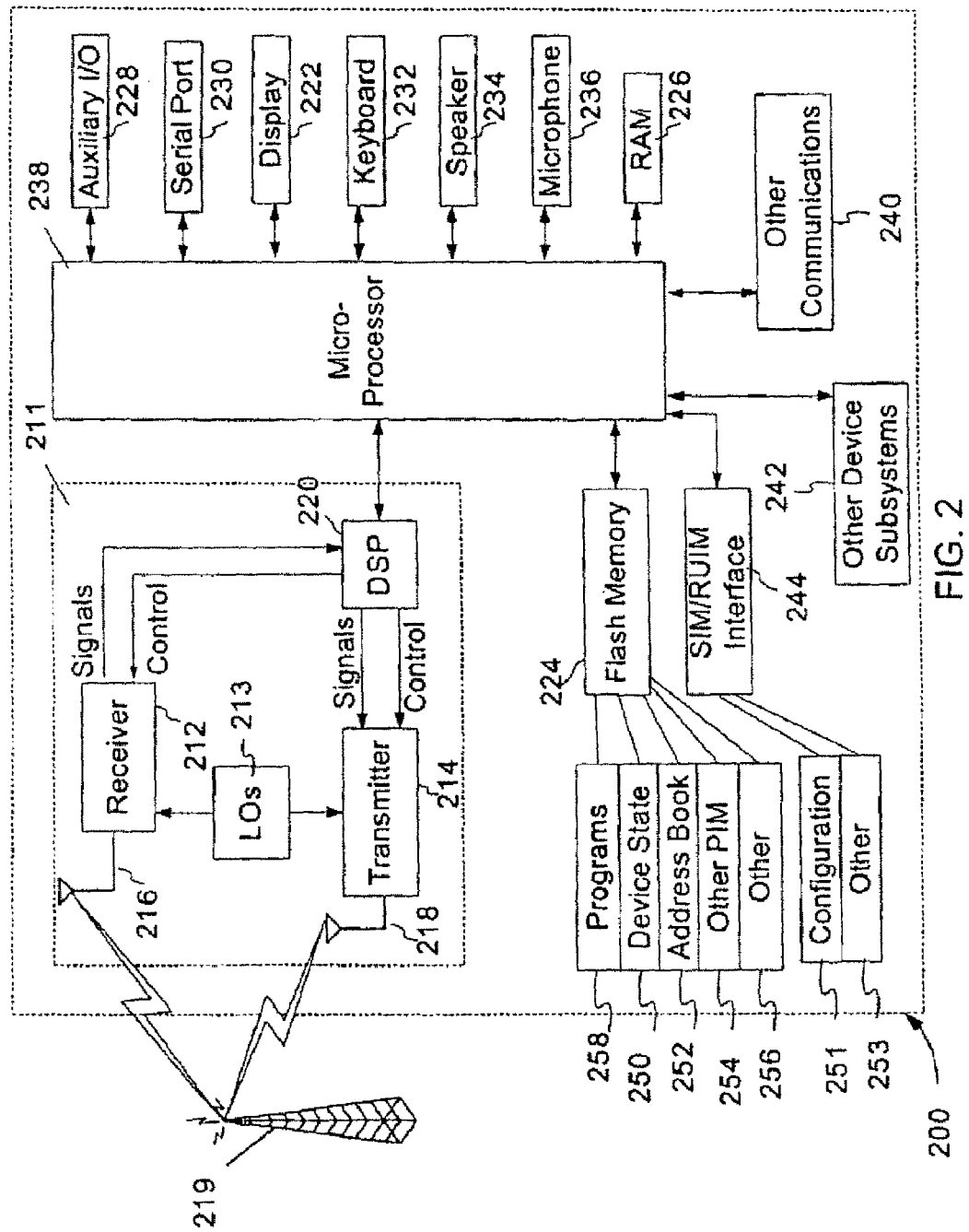
FIG. 2 is a block diagram illustrating a mobile electronic device embodying a wireless proximity awareness system and method.

FIG. 2 is a block diagram illustrating a mobile electronic device embodying a wireless proximity awareness system and method. Mobile electronic device 200 is preferably a two-way wireless electronic communication device having at least voice and data communication capabilities. Mobile electronic device 200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile electronic device 200 is enabled for two-way communication, it will incorporate a communication antenna subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate.

Mobile electronic device 200 includes a microprocessor 238 that controls the overall operation of the device. Communication functions, including at least data and voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

The other device subsystems 242 of interest include software objects of the client application responsible for handling proximity awareness and notification on the wireless device. These software objects will be further elaborated in the proceeding figures.

Mobile electronic device 200 also includes other components such as programs 258, device states 250, an address book 252, a PIM application 254, other applications 256, configuration information 251, and other information 253 relevant to the operation of the device. The aforementioned components in this paragraph, although available on the device and outlined in FIG. 1, are not critical to the functionality of this invention.

Figure 3:
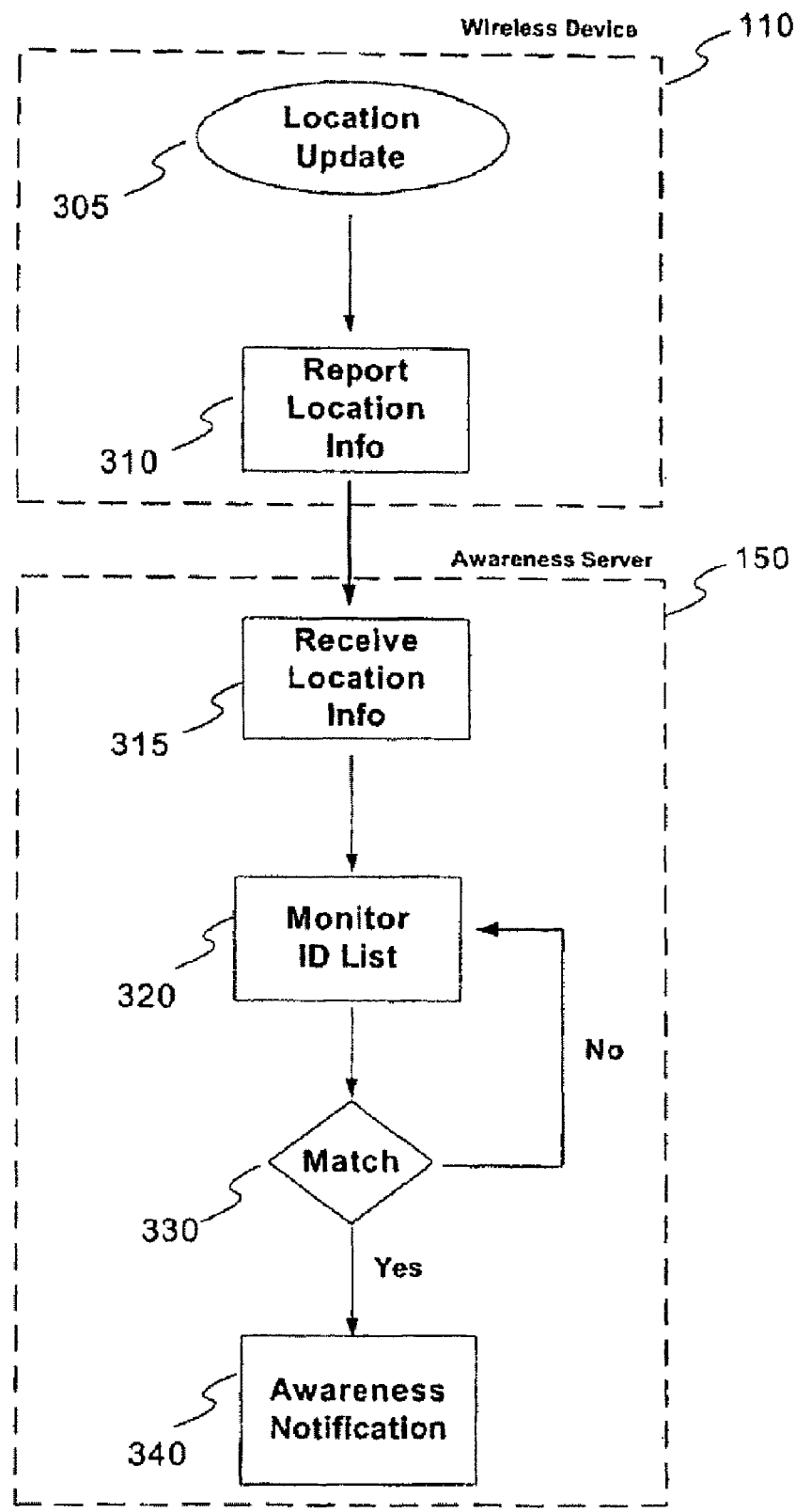
FIG. 3 is a flow diagram illustrating a notification process.

FIG. 3 is a flow diagram illustrating a notification process. The client application on the wireless device 110 performs a location update of location information including a Device ID and a Tower ID, at step 305. The Tower ID is a unique identifier of a wireless tower and represents the physical location of the tower. The Device ID is a unique identifier of a wireless device; it may be the serial number, the phone number or some other identifier. The location information is reported to the wireless network tower 120, at step 310.

In the system of FIG. 1, for example, this data will be sent from the client application across the Internet 130 to the awareness server 150. The awareness server 150 receives the location info at step 315 and processes the information. Since this location information is sent across a public communication path, the data is securely encrypted from the client application 110 to the awareness server 150 such that no location data is available in the clear at any point, other than at the awareness server 150, behind the intended organization's corporate firewall.

Once the location information (Tower IDs and Device IDs) is received at the awareness server 150, the information is inputted into an application where a listener object monitors the ID lists at step 320. The awareness server 150 contains three global ID lists of interest—a Device ID list, a Tower ID list and a User Buddy list. The Device ID list contains information on all devices registered on the system, including the Device IDs, the unique identifiers of each device. The Tower ID list is a list of all network towers that the awareness server can listen to. This Tower list contains network towers from different network carriers, associated with each wireless device. The User Buddy list contains a list of user profile of all users and a their contacts or buddies.

There is logic in the awareness server 150 that performs a comparison; if a match of two devices on the same contact list and on the same network tower is detected at step 330, an awareness notification is sent to both users at step 340 to indicate that they are in proximity to each other. It is up to the users at this point to decide whether they would like to communicate or physically meet considering their physical proximity. If the logic on the awareness server 150 does not detect a match, the server will continue to monitor the ID lists at step 320.

Location information (Tower ID and Device ID) is sent to the awareness server 150 at a predetermined time interval if the wireless device is locked onto one tower. If the device is not locked onto a tower, location information is sent immediately to the awareness server 150. An example of this includes the scenario where a wireless device switches to another tower.

In addition to broadcasting the Tower ID that the wireless device is currently connected to, the wireless device also sends a list of all neighbouring Tower IDs. This Tower ID list includes network towers from the device's own network carrier, as well as other neighbouring carriers using the same network technology (e.g., CDMA, GSM, etc). For example, a device broadcasts location information to the awareness server. It sends its Device ID, Tower ID AA from GSM network carrier X that it is currently communicating on, and neighbouring Tower IDs AB, AC and AD that are in proximity Tower ID AB is on the same network carrier X, but Tower IDs AC and AD are on GSM network carrier Y. This device connects only to network towers AB and AC from its own carrier; it can hear network towers AC and AD from a neighbouring network, but the device cannot connect to these towers.

One reason for reporting neighbouring Tower IDs (network towers) is to assist in monitoring of the Buddy list. The monitoring object 320 includes intelligent logic to resolve contacts that are in proximity on different network towers of the same network or on different networks. For example, if there are two contacts in San Francisco, one on a GPRS network and the other on a CDMA network and both users have the client application on their devices, the awareness server 150 will resolve a proximity match and send an awareness notification to both devices.

The wireless proximity logic does not require additional hardware such as Global Positioning System (GPS) peripheral to report location updates. The mapping of wireless proximity is conducted using a comparison of the list of wireless network towers. The awareness server 150 monitors a Buddy list, a Device list and a Tower list. If there is a match between buddies (contacts) on a user's Buddy list, with a specific device and tower, the awareness server will send out a notification to alert both contacts of their proximity.

Figure 4:
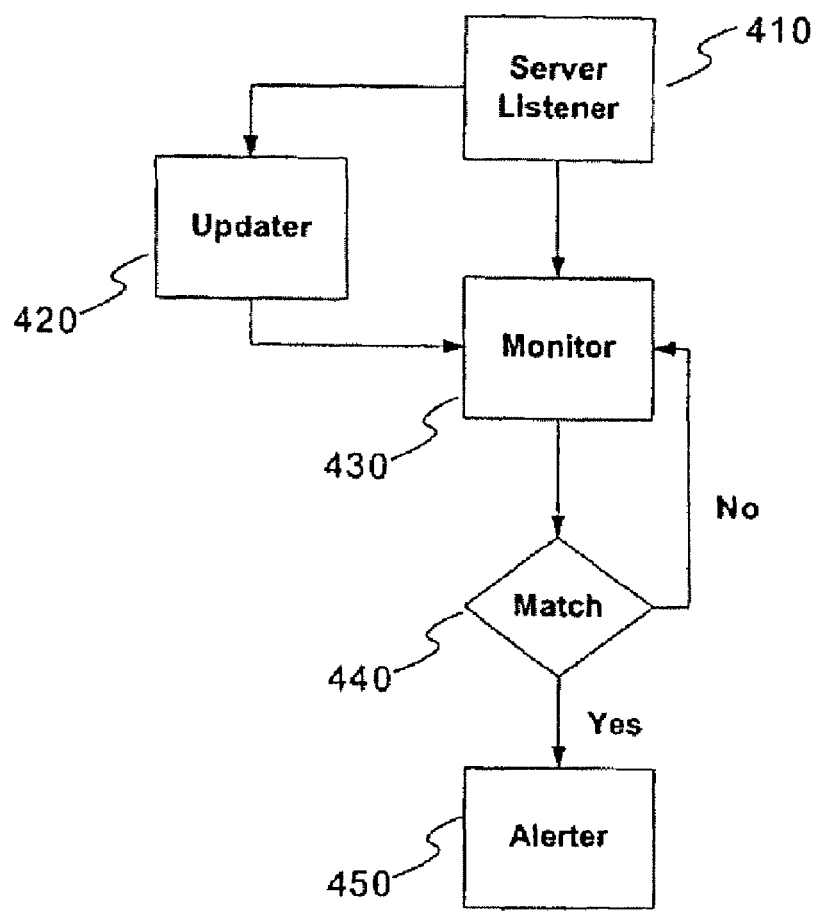
FIG. 4 is a block diagram illustrating the method of communication at the awareness server.

FIG. 4 is a block diagram illustrating the method of communication at the awareness server. The functionality of the awareness server is supported a number of server objects: including the server listener object 410, a monitor object 430, an updater object 420, a matching object 440 and an alerter object 450. The server listener object 410 listens to incoming location information from wireless devices and feeds the input to the monitor object 430. The monitor object 430 constantly monitors a list of network towers (Tower ID) and wireless devices (Device ID) associated with the user's Buddy-list. This list is updated through the updater object 420 if a new contact is added, removed or blocked from a user's Buddy-list.

A matching algorithm 440 performs a comparison of devices and network towers. If there is a match between multiple devices on the same network tower, the alerter object 450 is triggered to send out an awareness notification 340 to the wireless device. If there is no match, the matching algorithm will return to the monitor object 430 to continually monitor incoming requests from the Server Listener object 410. User preference is taken into consideration when alerts are sent out. For example, an awareness notification 340 is not sent out to individuals on the Buddy-list that are deemed blocked, or in an ignore or "Do Not Disturb" mode, even if there is a proximity match.

In certain embodiments of the awareness server 150, the matching algorithm 440 may include a time-based logic, capable of performing a fuzzy logic match, based on a configurable level of granularity. The fuzzy logic match is used to determine proximity of contacts in a Buddy list. For example, a user's contact in his Buddy list is 60 minutes away communicating on Tower A, and the user can hear Tower A. The fuzzy logic of the matching algorithm 440 generates a "proximity hit" of within an hour for that buddy and reports this detail to the user.

Figure 5:
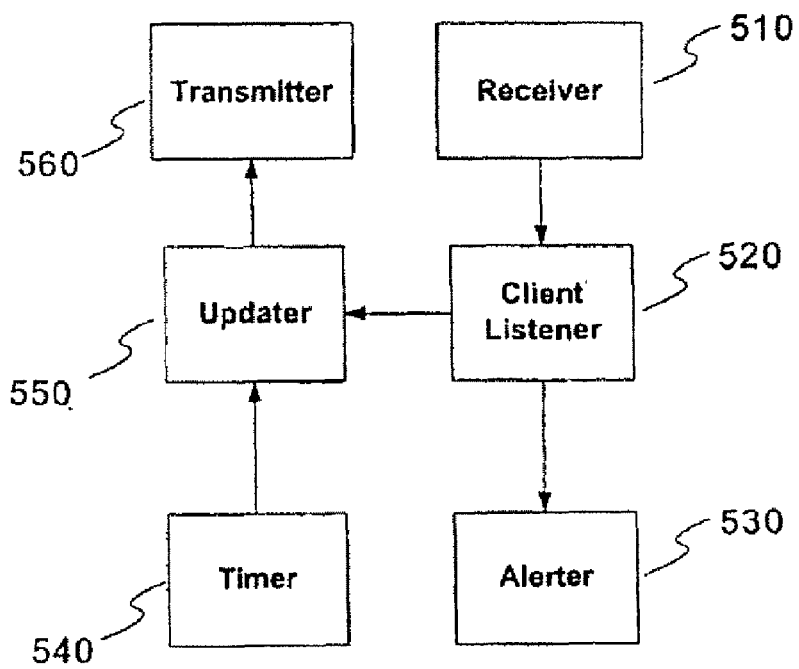
FIG. 5 is a block diagram illustrating the method of communication at the client application on the communication device.

FIG. 5 is a block diagram illustrating the method of communication at the client application on the communication device. The client application comprises a receiver 510, client listener 520, alerter 530, timer 540, updater 550 and transmitter 560 object. The receiver object 510 is associated with the RF receiver hardware of the wireless device; its purpose is to receive awareness notifications 340 or network tower location updates (Tower ID).

Once data is received on the receiver 510, it is sent to the client listener object 520 for processing. Based on the type of data received, the client listener object 520 will trigger the alerter object 530 to generate an audible or visual alert if the incoming data is an awareness notification 340 or pass the data onto the Updater object 550 if the incoming data is a Tower ID. The Updater object 550 will package the Tower ID info and combine it with the Device ID, the device unique identifier, and submit this info to the Transmitter object 560.

The Transmitter object controls the RF Transmitter hardware on the device to send the update data back to the Awareness Server 150 as a status update. In addition to receiving information from the client listener object 520, the updater object 550 receives periodic requests to update the device status from the timer object 560.

This design has a number of strengths which include the following:

A simple security algorithm (e.g., Public Key Cryptography) could be devised to ensure secure location sharing the list of contacts.

Proximity data passes over a wireless data channel, thereby ensuring that only two parties have access to that location data, and that a carrier could not resell the location data.

There is no geographic or longitude/latitude coordinate mappings required; the devices and awareness server determine if they can hear the same radio towers to initiate communication. No additional hardware is required for coordinate mapping data.

Awareness notification could be integrated into other applications on the wireless device. For example, a phone, e-mail or SMS alert can be triggered when a contact is nearby.

The client application and awareness server 150 may include additional features. One feature is to incorporate filters to determine user preference. Filters may be used to turn on/off notification, to accept/block users asking for presence tracking, and to place the user in different modes such as "Do Not Disturb", "Available", "In a Meeting" and "Offline" mode.

An additional feature may be to extend the awareness server to incorporate connectivity with instant messaging systems, for example, ICQ, AIM, MSN, Yahoo, and enable proximity awareness with contacts in these systems. A further feature may be to incorporate the functionality of the components of the awareness server 150 into the client application, thereby allowing communication between multiple users without the requirement of a server component.

The above-described embodiments of the present application are intended to be examples only. Those of skill in the art may effect alterations, modifications and variations to the particular embodiments without departing from the scope of the application.

It is claimed:

1. A method comprising:

monitoring a location of each of a plurality of mobile communication devices;

performing a comparison of the location of each of the plurality of mobile communication devices to the location of each other mobile communication device in the plurality of mobile communication devices, to determine which of the mobile communication devices are near each other, the location of each mobile communication device being based on a cellular network tower each respective communication device is communicating through;

determining, through the comparison, that a first mobile communication device is near a second mobile communication device based on both mobile communication devices communicating through a same cellular network tower; and triggered by the determination that the first and second mobile communication devices are near each other, transmitting a first notification to the first mobile communication device indicating the second mobile communication device is nearby.

2. The method of claim 1 wherein the transmitting includes transmitting a second notification to the second mobile communication device indicating the first mobile communication device is nearby.

3. The method of claim 1 wherein the first notification indicates a distance between the first and second mobile communication devices in terms of an amount of time.

4. The method of claim 1 wherein the comparison is between mobile communication devices of a common Buddy list.

5. The method of claim 1 wherein the monitoring, performing, determining and transmitting steps are performed by an awareness server.

6. The method of claim 1 wherein the monitoring includes receiving communications, from the each of the plurality of mobile communication devices, indicating which cellular network tower each of the plurality of mobile communication devices is respectively communicating through.

7. An awareness server configured to communicate with a plurality of wireless devices, comprising:
a listener object configured to monitor a location of each of a plurality of mobile communication devices;
a matching object coupled to the listener object, the matching object configured to perform a comparison of the location of each of the plurality of mobile communication devices to the location of each other mobile communication device in the plurality of mobile communication devices, to determine which of the mobile communication devices are near each other, the location of each mobile communication device being based on a cellular network tower each respective communication device is communicating through, and the matching object being further configured to determine, through the comparison, that a first mobile communication device is near a second mobile communication device based on both mobile communication devices communicating through a same cellular network tower; and
an alerter object coupled to the matching object, the alerter object configured to, triggered by the determination that the first and second mobile communication devices are near each other, transmit a first notification to the first mobile communication device indicating the second mobile communication device is nearby.

8. The awareness server of claim 7 wherein the alerter object is further configured to transmit a second notification to the second mobile communication device indicating the first mobile communication device is nearby.

9. The awareness server of claim 7 wherein the first notification indicates a distance between the first and second mobile communication devices in terms of an amount of time.

10. The awareness server of claim 7 wherein the comparison performed by the matching object is between mobile communication devices of a common Buddy list.

11. The awareness server of claim 7 wherein the monitoring by the listening object includes receiving communications, from the each of the plurality of mobile communication devices, indicating which cellular network tower each of the plurality of mobile communication devices is respectively communicating through.

* * * * *